United States Patent
Koch

(10) Patent No.: US 6,225,780 B1
(45) Date of Patent: May 1, 2001

(54) BATTERY CHARGE MAINTENANCE THROUGH OPPORTUNITY EQUALIZATION

(75) Inventor: Brian James Koch, Berkley, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/512,011

(22) Filed: Feb. 24, 2000

(51) Int. Cl.[7] .................................................. H02J 7/00
(52) U.S. Cl. ............................................. 320/118; 320/150
(58) Field of Search .................................. 320/118, 117, 320/119, 150, 152, 160, 137

(56) References Cited

U.S. PATENT DOCUMENTS

| | | | |
|---|---|---|---|
| 5,498,950 | 3/1996 | Ouwerkerk | 320/119 |
| 5,504,415 | 4/1996 | Podrazhansky et al. | 320/118 |
| 5,578,915 | * 11/1996 | Crouch, Jr. et al. | 320/118 |
| 5,739,670 | * 4/1998 | Brost et al. | 320/131 |
| 5,757,163 | 5/1998 | Brotto et al. | 320/155 |
| 5,889,385 | * 3/1999 | Podrazhansky et al. | 320/150 |
| 5,912,547 | * 6/1999 | Grabon | 320/150 |
| 6,011,380 | * 1/2000 | Paryani et al. | 320/150 |

* cited by examiner

Primary Examiner—Peter S. Wong
Assistant Examiner—Lawrence Luk
(74) Attorney, Agent, or Firm—Anthony Luke Simon

(57) ABSTRACT

In one aspect of the invention as applied to vehicles, such as electric automotive systems, battery equalization is optimized through performance simultaneously with other routine vehicle functions in the way of maintenance during periods when the temperature of the battery pack is in a lower temperature regime. An equalization current is chosen as a function of the ambient conditions and effectiveness of the thermal system detected by the battery pack control module, so that heat can be minimized as well as then more easily removed from the battery pack, thereby also reducing the length of the process. Opportunity equalization therefore is performed more frequently than is typical at more convenient times and in a manner to optimize the process in view of existing conditions.

16 Claims, 2 Drawing Sheets

BATTERY CHARGE MAINTENANCE THROUGH OPPORTUNITY EQUALIZATION

FIELD OF THE INVENTION

The present invention generally relates to battery charging, and more particularly to a battery charging method and apparatus for what is commonly referred to as equalization of charge of a plurality of series connected batteries in an electrochemical pack.

BACKGROUND OF THE INVENTION

The present invention finds its origin in a nickel metal hydride battery pack for particular application as a propulsion source of energy in an electric vehicle, such as an automobile. As will be evident hereafter, however, it is not just limited to such an application or environment, but may have application to series strings of batteries as are used in back-up or uninterruptable power supplies, spacecraft and the like.

In the environment of a motive power source for an electric vehicle, the battery system is subject to widely varying discharge currents and discharge rates, sometimes severe operating temperatures, deep discharges and frequent recharge events. Battery packs used in such vehicles are generally series coupled cells.

Variation in the amount of energy stored in each battery at any given time gradually develops as the result of battery-to-battery performance differences, which may result from internal impedances, impurities, density of electrolytic material, age, or ambient temperature gradients across the battery pack, to name some such influences. All batteries made to the same standard at the same time from the same materials are therefore by no means identical. Small differences in cell make-up and constituent elements become exacerbated over time. Since the batteries are arranged in a pack, some may be exposed to one ambient temperature on one side of the pack, with a different temperature on the other. Areas of the pack may dissipate heat differently depending on how the batteries of the pack are exposed, or for that matter confined. These temperature gradients affect the individual cell's performance.

The capability of the battery pack, and therefore the range of the vehicle, is in large measure then determined by the battery that contains the least amount of energy. That is, in discharging such a series connected pack, the amount of useful energy depends upon the weakest cell. Accordingly, a battery that falls to a significantly lower state of charge (SOC) than the others will cause a concomitant reduction in vehicle range. Extreme imbalance can result in what is termed cell reversal, which occurs when one battery is significantly different in energy content from others in the pack, as where one cell has become fully discharged while others remain at least partially charged. Further use of the pack can cause a reverse polarity voltage in the discharged cell, causing deterioration of that battery. The ability to balance the energy, or charge, in each of the batteries improves the life of the individual batteries as well as the useful capacity of the entire pack.

Equalization of the battery pack is a process by which more charge is returned to the batteries than was removed through vehicle use or self-discharge, for instance. In a procedure where charge is being returned to all of the batteries in a pack in common during equalization, batteries that are or soon become fully charged begin oxygen recombination in an overcharge condition, and produce heat, while batteries at a lower state of charge continue to increase in capability until they also begin oxygen recombination. At that point, SOC balance is considered to have been achieved among the batteries in the pack.

This equalization, or balancing, process is typically performed over a fixed time period following normal recharge. The current that is applied to the batteries is selected to give the most effective equalization in the time being allotted for the procedure. Typically, the current is a low one passed through the battery pack, in order to bring the undercharged batteries up while minimizing the evolution of gas through electrolysis in the overcharged cells. This is because a battery at about 90% of full charge shows reduced effectiveness of charge acceptance at a high charging rate. However, operating at the low current for charge equalization extends the charging process in general.

Overcharge obviously requires additional charge time, and does not significantly increase the amount of useful energy stored in the battery pack. Disadvantages of this approach include an overly-extended duration of charge, as well as additional energy consumption by the vehicle's battery thermal management system, as it is caused to remove the extra heat being generated by oxygen recombination of fully-charged batteries while others in the pack reach equalization level.

SUMMARY OF THE INVENTION

It is a principal objective of the present invention to reduce the charge time for equalization as well as reduce energy consumption of the thermal management system during equalization. This objective has been achieved in one aspect of the invention as applied to vehicles, such as electric automotive systems, through the recognition that the equalization process can be optimized if performed simultaneously with other routine vehicle functions in the way of maintenance during periods when the temperature of the battery pack is in a lower temperature regime. For instance, if the vehicle is in a dormant state and connected to a charger, such as in overnight charging, an opportunity for optimum equalization is presented. This would be when the vehicle systems "wake up" to provide periodic thermal management for the batteries. Equalization is also optimal during cooling, such as after a recharge event.

An equalization current is chosen as a function of the ambient conditions and effectiveness of the thermal system detected by the battery pack control module, so that heat can be minimized as well as then more easily removed from the battery pack, thereby also reducing the length of the process which would otherwise be prolonged in order to dissipate excessive heat that would be generated at a less than optimum time. Opportunity equalization therefore is performed more frequently than is typical, and at more convenient times, and in a manner to optimize the process in view of existing conditions. It is particularly desirable to perform the opportunity equalization at a time when the batteries are as fully charged as possible at the start of the process.

In addition, since the heat evolved during equalization is in general proportional to the current, it is considered further desirable to vary the equalization current as a function of pack temperature as well as cooling effectiveness of the pack thermal system. Advantages are considered to be reductions in charge times and attendant energy consumption, as well as increased longevity of the batteries through reductions in operating temperatures in the equalization process.

The present invention in one form provides for an improved battery charging apparatus and method comprising a controller and battery balancing system including an, algorithm which monitors and balances the charging of a plurality of series connected batteries of a battery pack. For instance, as for example in a rechargeable nickel metal hydride battery pack, a method of equalizing a state of charge among multiple batteries in the battery pack in accordance with one aspect of the invention comprises determining if the pack cooling system is in a cooling mode and engaged in pack cooling. A pre-selected state of charge ($SOC_{min}$) below which equalization will not occur is established, along with a first re-selected pack temperature ($T_{opp}$) above which equalization will not occur, have previously been established as operating criteria. Preferably, a second pre-selected cooling medium inlet temperature criterion ($T_{hi}$) above which pack cooling by the pack cooling system is considered reduced in effectiveness, is also established.

Temperature is then measured of the overall pack temperature, $T_{opp}$ and $T_{hi}$ being preferably measured at an inlet to the pack cooling system through which cooling medium flows before heat transfer from the pack. State of charge of the pack is measured. If the cooling system is in the cooling mode, equalization of charge in the pack is initiated at a first current if the state of charge is above said $SOC_{min}$ and the overall pack temperature is below $T_{opp}$. Most preferably equalization of charge in the pack may additional occur at a second current which is lower than the first current, with the second current being most advantageously varied as a function of temperature, if the state of charge is above said $SOC_{min}$ and the pack temperature is below the $T_{opp}$ but the cooling medium inlet temperature is greater than $T_{hi}$. Equalization continues until the pack cooling mode has been completed or a pre-established amp-hour input has been reached.

An apparatus for improved equalization of state of charge in a rechargeable electrochemical battery system having a series arrangement of multiple batteries in a pack, and a pack cooling system having a cooling mode, is likewise provided by the present invention. This apparatus includes a battery pack controller having comparator circuitry. The controller is programmed with the pre-selected state of charge criterion ($SOC_{min}$) below which equalization will not occur, and the first pre-selected pack temperature criterion ($T_{opp}$) above which equalization will not occur.

A temperature sensor communicates with a pack temperature sensing point, and generates a temperature signal. A current sensor detects pack current, which is communicated to the controller to calculate state of charge by the method of amp-hour integration. Signal circuitry communicates the temperature and current signals to the controller. Equalization charge circuitry couples a source of current to each battery.

The controller has an equalization program which initiates an equalization charge from the source of current at a first current when the state of charge is above the $SOC_{min}$ and the pack temperature is below $T_{opp}$. Preferably, the controller is further programmed with a second pre-selected cooling medium inlet temperature criterion ($T_{hi}$) above which pack cooling by the pack cooling system is considered reduced in effectiveness. The program then instead initiates equalization of charge in the pack at a second current which is lower than the first current if the state of charge is above said $SOC_{min}$, and the pack temperature is below the $T_{opp}$, and the cooling medium inlet temperature is above the $T_{hi}$.

The invention, along with its advantages, will be further understood upon consideration of the following detailed description of an embodiment taken in conjunction with the drawings, in which:

DETAILED DESCRIPTION OF AN EMBODIMENT OF THE INVENTION

Figure 1:
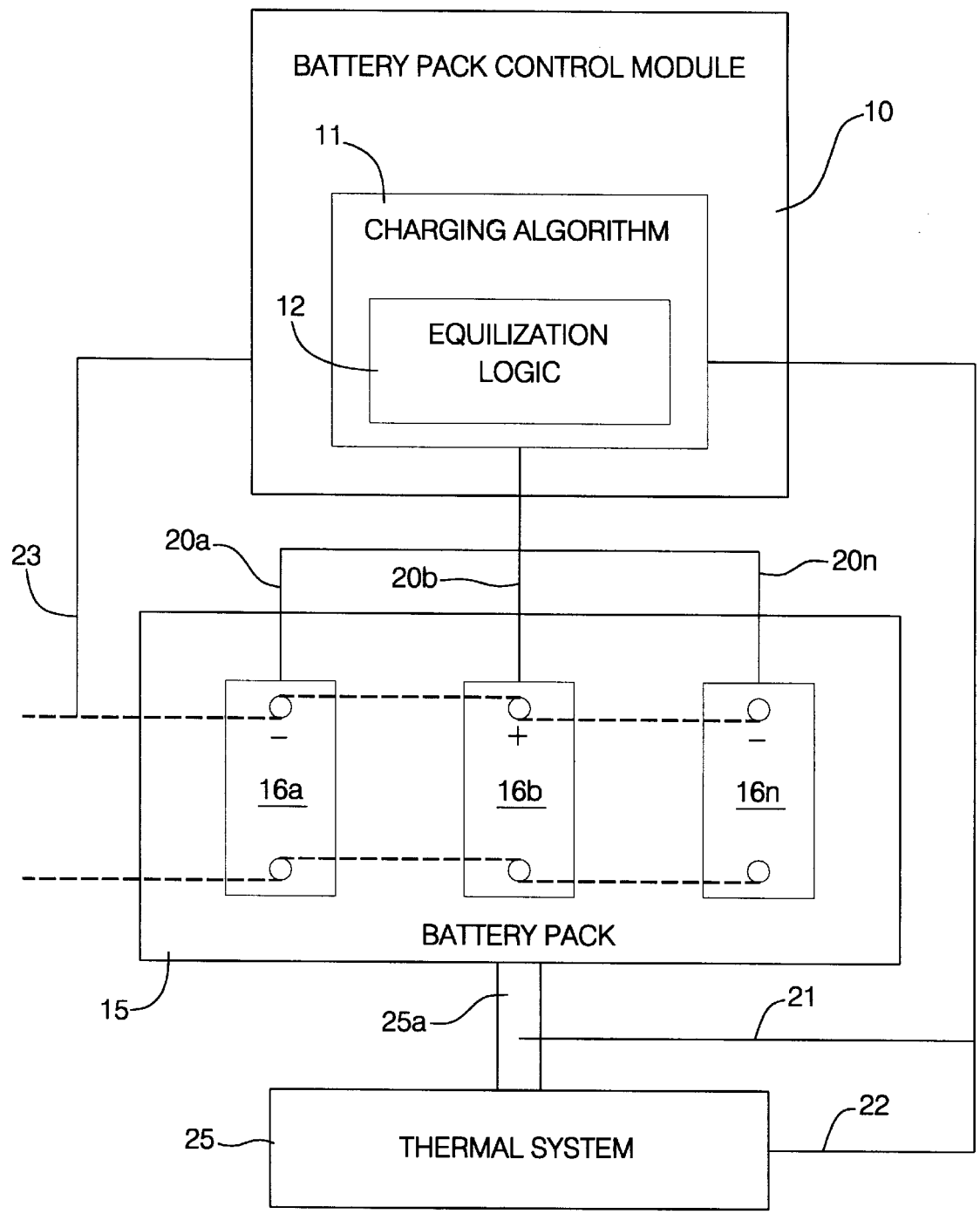
FIG. 1 is a schematic block-type diagram of the general components of a system in accordance with the present invention.

Referring now to FIG. 1 in the first instance, a block-type diagram of a presently preferred embodiment of the invention is shown. This is a computer based system for dynamically determining opportune periods for battery equalization, otherwise referred to as balancing. At the core of the system is a battery pack control module ("BPM") 10 having a charging algorithm 11 which includes the equalization logic 12 that will hereinafter be described. The BPM is relatively standard, having the usual CPU, clock, ROM, RAM, discrete I/O ports, A/D conversion circuitry, serial communication and data links for external device communication, control and data transfer, and the like well known in the art.

Battery pack 15 is a standard series-type arrangement of individual modules 16, or otherwise referred to herein as batteries or cells. In one application of the present invention, these are a plurality of nickel hydride cells 16a, 16b ... 16n for use as a propulsion power source for an automotive vehicle. Other vehicle accessories may be powered by another battery system.

Temperature readings for each of the batteries are obtained from respective temperature sensor, such as suitable thermistors or thermocouples, which are represented in the drawing as lines 20a, 20b and 20n. State of charge (SOC) is also determined for the battery pack through standard amp-hour integration of the current signal, here indicated by line 23. Suitable circuitry transmits signals of temperature 20a, 20b and 20n and current 23 to the BPM.

The battery pack 15 has a standard thermal system for managing the temperature of the battery pack 15, such as in dissipating or rejecting heat during battery charging events. The thermal system 25 may be liquid cooled or air cooled, for instance. The fluid medium used has at least one inlet point to the thermal system, indicated here as 25a. Another temperature sensor indicated by line 21 monitors the fluid medium temperature, providing signals via appropriate circuitry to the BPM. A signal indicative of whether the thermal system 25 is or is not operating is also provided via line 22.

Figure 2:
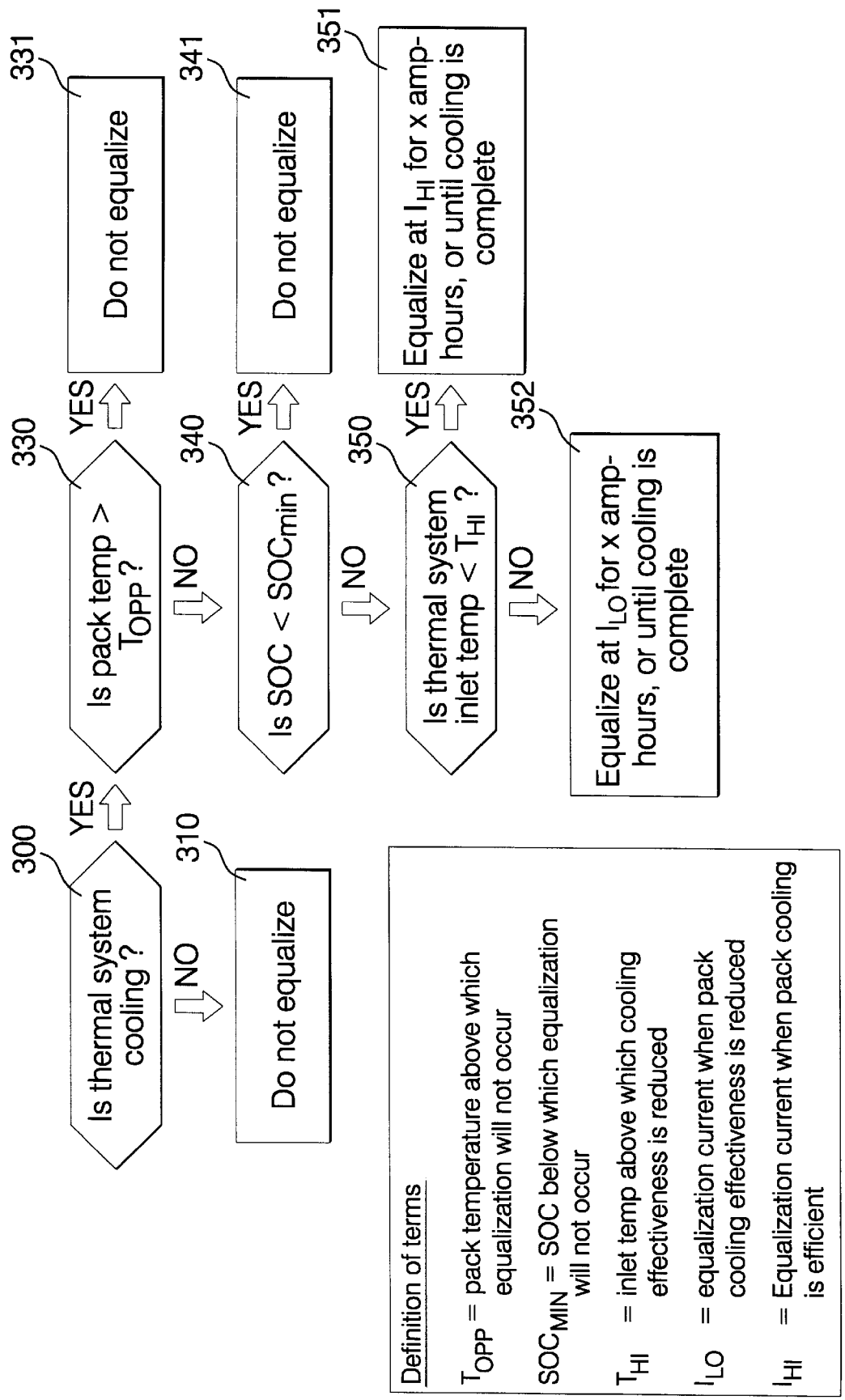
FIG. 2 is a flow diagram of program logic for carrying out an opportunity equalization system in accordance with the present invention.

Referring now to FIG. 2 in particular, a representative process flowchart is shown for a logic sequence executed by the BPM 10 to perform the opportunity equalization of the present invention. FIG. 2 is essentially an executive or main loop program which would include subroutines for performing various tasks. These subroutines will not be described in any detail herein, being generally standard and well understood on their own.

At block 300, the BPM reads the input signal 22 to initially determine whether the thermal system 25 is operating in a cooling cycle or not. If it is not, opportunity equalization is not effected, as indicated by block 310. If thermal system 25 is in operation, then a reading is made of the temperature of the thermal system medium temperature (signal 21). That fluid medium temperature, which is equated as a general or overall battery pack temperature state, is then compared against a pack temperature above which equalization is not desired to occur ($T_{opp}$). The equalization logic 11 of the BPM also determines an overall SOC, which is then compared against an SOC below which equalization is not desired to occur ($SOC_{min}$). $T_{opp}$ and $SOC_{min}$ are predetermined values programmed into comparator circuitry of the BPM. These threshold values of $T_{opp}$ and $SOC_{min}$ are derived from substantially representative values experienced in batteries of the type utilized in the system and empirically determined. SOC in general is a function of the fall capacity of the battery at 100% state of charge (Qf) and the cumulative capacity removed from the pack (Qd) in accordance with the following formula:

$$SOC=(Qf-Qd)/Qf$$

which yields the state of charge as the ratio of charge not removed to a full charge.

As illustrated in blocks 330 and 340, if the pack temperature signal 20a, 20b, 20n is above $T_{opp}$ or the SOC is above $SOC_{min}$, then opportunity equalization is not effected, as indicated by blocks 331 and 341. If the conditions of blocks 330 and 340 are met, then a comparison is made as to whether the thermal system inlet temperature is above a predetermined value whereat cooling effectiveness is considered to be reduced ($T_{hi}$), as indicated at block 350. $T_{hi}$ is again a value programmed into comparator circuitry of the BPM.

If the block 350 comparison indicates a temperature which is less than $T_{hi}$, block 351 illustrates an opportunity equalization process which is then engaged wherein balancing is effected at a current selected for pack cooling then occurring at a more or most efficient rate ($I_{hi}$). Equalization would continue at $I_{hi}$ for a pre-selected period ("x") of amp-hours related to the conventional design capacity of the batteries in general, determined in accordance with well known techniques, or until the normal pack cooling maintenance process has been completed.

Should the inlet temperature (signal 21) be above $T_{hi}$, block 352 illustrates an opportunity equalization process which is engaged wherein balancing is effected at a current selected for conditions where the pack cooling effectiveness is considered to be reduced ($i_{lo}$). Equalization likewise continues at $I_{lo}$ for x amp-hours (A*hr), or until the pack cooling has been completed.

As noted above, opportunity equalization is performed in conjunction with other battery maintenance, typically during battery cooling. These events would trigger initiation of the equalization logic beginning with block 300. An optimized current is applied which equalizes the batteries in the pack while minimizing the production of heat through overcharging, so that the duration of pack cooling is likewise minimized. $I_{lo}$ and $I_{hi}$ can furthermore be varied along a continuum as a function of overall pack temperature and cooling effectiveness of the thermal system 25, as provided by an appropriate look-up table in the comparator circuitry of the BPM. Sources of charge current include off-vehicle current sources such as standard external pack chargers and/or on-vehicle regenerative braking sources.

In one application of the invention, the thermal system used was an air-cooled system, i.e., ambient air was used as the cooling medium in a non-recirculating arrangement. The battery type in point was a nickel metal hydride deep cycle having approximately a 90–100 amp-hour capacity, 200 W/kg, and a 65W-hr/kg specific energy.

Temperature $T_{hi}$ was taken at the air inlet, to thereby take into account the effect of ambient air temperature, and establish the cooling effectiveness of the airstream (cooling medium) that was being applied to the battery pack. The higher the temperature of the cooling medium, the less effective the heat transfer from the battery pack.

The particular $T_{hi}$ chosen was 12° C. It was arrived at empirically, essentially being established from the amount of time it took the battery pack to cool in general over the span of a typical nighttime non-use cycle. $T_{hi}$ is thus a function of the type of battery pack in point.

It should be additionally noted that in a recirculating cooling medium (such as a liquid coolant) where the temperature of the coolant being output to the battery pack can be more controlled, $T_{hi}$ can essentially drop out of the equation, as being essentially met by the closed loop system presumably operating at less than $T_{hi}$. This would also effectively drop $I_{lo}$ as a factor, again since it could be assumed that the thermal system is always operating at less than $T_{hi}$.

$T_{opp}$ was chosen in the foregoing application such that an undesired amount of heating was not generated at the end of the equalization process. This was an empirical determination, and was particularly made with an eye toward avoiding a thermal runaway event. A $T_{opp}$ of 38° C. was used in the exemplary embodiment.

$SOC_{min}$ was selected at 97%, which was a point where the battery was not fully charged, and therefore it would use some of the current intended for opportunity equalization to reach a 100% charge state, then proceed to equalization.

$I_{lo}$ and $I_{hi}$ were chosen as fairly standard values for this type of battery pack and cooling medium, essentially being selected to avoid a thermal runaway event. $I_{lo}$ was 2A and $I_{hi}$ 4A. An equalization amp-hour limit was set at 7 A-hr. While dependent on battery type, the limit set for this application was intended to include the amp-hours required to first reach 100% state of charge, and then progress into and complete equalization.

While the invention has been discussed with respect to a presently preferred embodiment, those of skill in the art will recognize various modifications, variations and alternatives that still will fall within the intended scope of the invention.

What is claimed is:

1. In a rechargeable electrochemical battery system having a series arrangement of multiple batteries in a pack, and a pack cooling system having a cooling mode, a method of equalizing a state of charge among the multiple batteries, comprising the steps of:

establishing a pre-selected state of charge criterion ($SOC_{min}$) below which equalization will not occur;

establishing a first pre-selected pack temperature criterion ($T_{opp}$) above which equalization will not occur;

measuring overall pack temperature;

calculating state of charge; and initiating equalization of charge in the pack at a first current if the state of charge is above said $SOC_{min}$ and said overall pack temperature is below $T_{opp}$.

2. The equalization method of claim 1 further including the steps of:

establishing a second pre-selected cooling medium temperature criterion ($T_{hi}$) above which pack cooling by the pack cooling system is considered reduced in effectiveness, and initiating equalization of charge in the pack at a second current which is lower than said first current if the second pre-selected temperature is above said $T_{hi}$, said second current being applied rather than said first current.

3. The equalization method of claim 2 wherein the pack cooling system has a cooling medium, and $T_{hi}$ is measured at a point in the pack cooling system through which said cooling medium flows before heat transfer from the pack.

4. A method of equalizing a state of charge among multiple batteries in a rechargeable electrochemical battery system having a series arrangement of the batteries in a pack, and a pack cooling system having a cooling mode using a cooling medium, comprising the steps of:

determining if the pack cooling system is in the cooling mode and engaged in pack cooling;

establishing a pre-selected state of charge criterion ($SOC_{min}$) below which equalization will not occur;

establishing a first pre-selected pack temperature criterion ($T_{opp}$) above which equalization will not occur;

establishing a second pre-selected temperature criterion ($T_{hi}$) based upon a cooling medium temperature above which pack cooling by the pack cooling system is considered reduced in effectiveness, measuring overall pack temperature;

calculating state of charge; and if the cooling system is in the cooling mode, initiating equalization of charge in the pack at a first current if the state of charge is above said $SOC_{min}$ and said overall pack temperature is below $T_{opp}$, and said cooling medium temperature is less than $T_{hi}$, or initiating equalization of charge in the pack at a second current which is lower than said first current if the state of charge is above said $SOC_{min}$ and the pack temperature is below said $T_{opp}$ but said cooling medium temperature is above said $T_{hi}$.

5. The equalization method of claim 4 wherein $T_{hi}$ is measured to determine the cooling medium temperature as applied to the pack.

6. The equalization method of claim 2 wherein said second current is varied as a function of temperature.

7. The equalization method of claim 2 wherein equalization continues until the pack cooling mode has been completed or a pre-established amp-hour input has been reached.

8. The equalization method of claim 4 wherein said second current is varied as a function of temperature.

9. The equalization method of claim 4 wherein equalization continues until the pack cooling mode has been completed or a pre-established amp-hour input has been reached.

10. In a rechargeable nickel metal hydride battery pack, a method of equalizing a state of charge among multiple batteries the battery pack having a series arrangement of the batteries in the pack, and a pack cooling system having a cooling medium and a cooling mode, comprising the steps of:

determining if the pack cooling system is in the cooling mode and engaged in pack cooling;

establishing a pre-selected state of charge criterion ($SOC_{min}$) below which equalization will not occur;

establishing a first pre-selected pack temperature criterion ($T_{opp}$) above which equalization will not occur;

establishing a second pre-selected cooling medium temperature criterion ($T_{hi}$) above which pack cooling by the pack cooling system is considered reduced in effectiveness, measuring overall pack temperature, with $T_{hi}$ being measured at a point in the pack cooling system through which said cooling medium flows before heat transfer from the pack to establish the temperature of the cooling medium as applied to the pack;

measuring state of charge; and if the cooling system is in the cooling mode, initiating equalization of charge in the pack at a first current if the state of charge is above said $SOC_{min}$ and said overall pack temperature is below $T_{opp}$, and the cooling medium temperature is less than $T_{hi}$, or initiating equalization of charge in the pack at a second current which is lower than said first current, said second current being varied as a function of temperature, if the state of charge is above said $SOC_{min}$ and the pack temperature is below said $T_{opp}$ but the cooling medium temperature is above said $T_{hi}$, with equalization continuing until the pack cooling mode has been completed or a pre-established amp-hour input has been reached.

11. An apparatus for improved equalization of state of charge in a rechargeable electrochemical battery system having a series arrangement of multiple batteries in a pack, and a pack cooling system having a cooling mode, comprising:

a battery pack controller having comparator circuitry, said controller being programmed with a pre-selected state of charge criterion ($SOC_{min}$) below which equalization will not occur, and a first pre-selected pack temperature criterion ($T_{opp}$) above which equalization will not occur;

a temperature sensor communicating with a pack temperature sensing point, said temperature sensor generating a temperature signal;

a current sensor communicating with the battery pack to calculate state of charge;

signal circuitry communicating said temperature signal and said current signal to said controller;

equalization charge circuitry connecting a source of current to each said battery; and said controller having an equalization program which initiates an equalization charge from said source of current at a first current when the state of charge is above said $SOC_{min}$ and said pack temperature is below $T_{opp}$.

12. The equalization apparatus of claim 11 wherein said controller is further programmed with a second pre-selected cooling medium temperature criterion ($T_{hi}$) above which pack cooling by the pack cooling system is considered reduced in effectiveness, and said program initiates equalization of charge in the pack at a second current which is lower than said first current if the state of charge is above said $SOC_{min}$, and the pack temperature is below said $T_{opp}$ but said cooling medium temperature is above said $T_{hi}$.

13. The equalization apparatus of claim 12 wherein said program varies said second current as a function of temperature.

14. The equalization apparatus of claim 13 wherein said program continues equalization until the pack cooling mode has been completed or a pre-established amp-hour input has been reached.

15. An apparatus for improved equalization of state of charge in a rechargeable electrochemical battery system having a series arrangement of multiple batteries in a pack, and a pack cooling system having a cooling mode, comprising:

battery pack controller means having comparator circuitry, said controller means being programmed with a pre-selected state of charge criterion ($SOC_{min}$) below which equalization will not occur, and a first pre-selected pack temperature criterion ($T_{opp}$) above which equalization will not occur;

temperature sensing means communicating with a pack temperature sensing point, said temperature sensor means generating a temperature signal;

state of charge sensor means communicating with said battery pack for measuring state of charge, said state of charge sensor means generating a charge signal;

signal circuitry means communicating said temperature signal and said charge signal to said controller means;

equalization charge circuitry means for connecting a source of current to each said battery; and said controller means further having equalization program means for initiating an equalization charge from said source of current at a first current when the state of charge is above said $SOC_{min}$ and said pack temperature is below $T_{opp}$.

16. The equalization apparatus of claim 15 wherein said controller means is further programmed with a second pre-selected pack temperature criterion ($T_{hi}$) relating to cooling medium temperature above which pack cooling by the pack cooling system is considered reduced in effectiveness, and said program means initiates equalization of charge in the pack at a second current which is higher than said first current if the state of charge is above said $SOC_{min}$, the pack temperature is below said $T_{opp}$ and the cooling medium temperature is above said $T_{hi}$.

* * * * *